(12) United States Patent
Cirino

(10) Patent No.: US 6,761,514 B2
(45) Date of Patent: Jul. 13, 2004

(54) HOLLOW MILL TOOL

(75) Inventor: John M. Cirino, Kirtland, OH (US)

(73) Assignee: Master Tool Corporation, Grand River, OH (US)

( * ) Notice: Subject to any disclaimer, the term of this patent is extended or adjusted under 35 U.S.C. 154(b) by 76 days.

(21) Appl. No.: 10/038,028

(22) Filed: Oct. 19, 2001

(65) Prior Publication Data
US 2003/0077129 A1 Apr. 24, 2003

(51) Int. Cl.$^7$ .................. B23C 5/20; B23B 27/22; B23B 51/00
(52) U.S. Cl. .................. 408/203.5; 407/58; 407/40; 407/48; 407/61; 407/53; 408/227
(58) Field of Search .................. 82/130; 30/495; 407/33, 34, 40, 48, 61, 58, 53, 113; 408/203.5, 227, 230, 223, 713

(56) References Cited

U.S. PATENT DOCUMENTS

| 759,425 | A |   | 5/1904  | Elmiger |
|---|---|---|---|---|
| 1,721,378 | A | * | 7/1929  | Draeger ................ 408/89 |
| 3,662,444 | A | * | 5/1972  | Erkfritz ................ 407/41 |
| 3,966,349 | A | * | 6/1976  | Osman et al. ............ 408/204 |
| 4,157,879 | A | * | 6/1979  | Steele ................ 408/83 |
| 4,547,100 | A |   | 10/1985 | Naccarato et al. |
| 4,573,831 | A |   | 3/1986  | Lacey |
| 4,595,320 | A |   | 6/1986  | Brener et al. |
| 4,681,485 | A |   | 7/1987  | Koelewijn |
| 4,915,182 | A |   | 4/1990  | Magyari et al. |
| 5,033,916 | A |   | 7/1991  | Dunklau |
| 5,054,972 | A | * | 10/1991 | Cooney ................ 408/211 |
| 5,094,573 | A | * | 3/1992  | Hougen ................ 409/132 |
| 5,176,191 | A |   | 1/1993  | Owens |
| 5,328,304 | A | * | 7/1994  | Kress et al. ............ 408/83 |
| 5,395,186 | A |   | 3/1995  | Qvart |
| 5,401,125 | A | * | 3/1995  | Sevack et al. .......... 408/203.5 |
| 5,658,101 | A |   | 8/1997  | Hammer |
| 5,782,589 | A |   | 7/1998  | Cole |
| 5,800,079 | A |   | 9/1998  | Qvarth |
| 5,810,524 | A | * | 9/1998  | Wirth et al. ............ 408/203.5 |
| 5,893,683 | A |   | 4/1999  | Johnson |
| 6,004,080 | A |   | 12/1999 | Qvarth et al. |
| 6,033,159 | A | * | 3/2000  | Kress et al. ............ 408/83 |
| 6,086,290 | A |   | 7/2000  | Qvarth et al. |
| 6,102,630 | A | * | 8/2000  | Flolo ................ 407/42 |
| 6,123,490 | A |   | 9/2000  | Underhill |
| 6,158,927 | A |   | 12/2000 | Cole et al. |
| 6,220,794 | B1 | * | 4/2001  | Calamia et al. .......... 407/40 |
| 6,379,090 | B1 | * | 4/2002  | Halley et al. ............ 408/227 |
| 6,533,506 | B1 | * | 3/2003  | Hite ................ 408/153 |

* cited by examiner

Primary Examiner—A. L. Wellington
Assistant Examiner—Brian D. Walsh
(74) Attorney, Agent, or Firm—Pearne & Gordon LLP

(57) ABSTRACT

A hollow mill tool comprising a shank portion and a plurality of radially spaced and axially extending tool posts integrally formed with and projecting from the shank portion. Each tool post has a longitudinal cutting insert mounting face and each mounting face defines a first plurality of axially extending serrations. A cutting insert is mounted on each mounting face and each insert has a second plurality of axially extending serrations defining a back face and intermeshing with the first plurality of serrations. A threaded fastener extends through a front face of each cutting insert and is received in each of the tool posts to securely hold each cutting insert against its tool post.

5 Claims, 2 Drawing Sheets

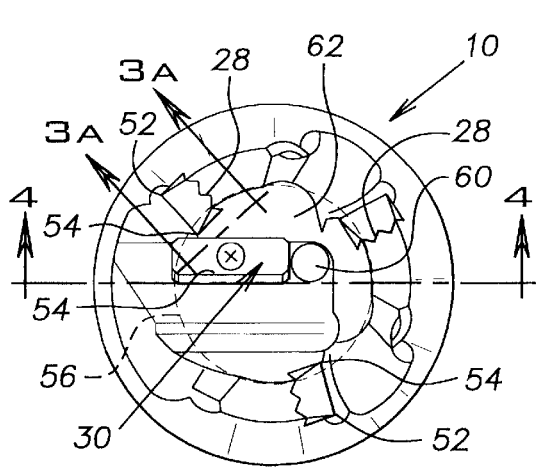
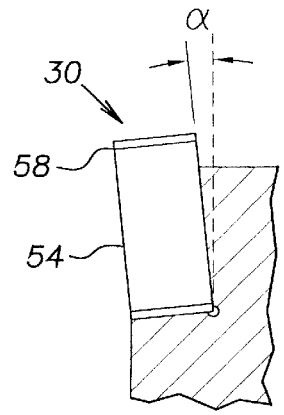
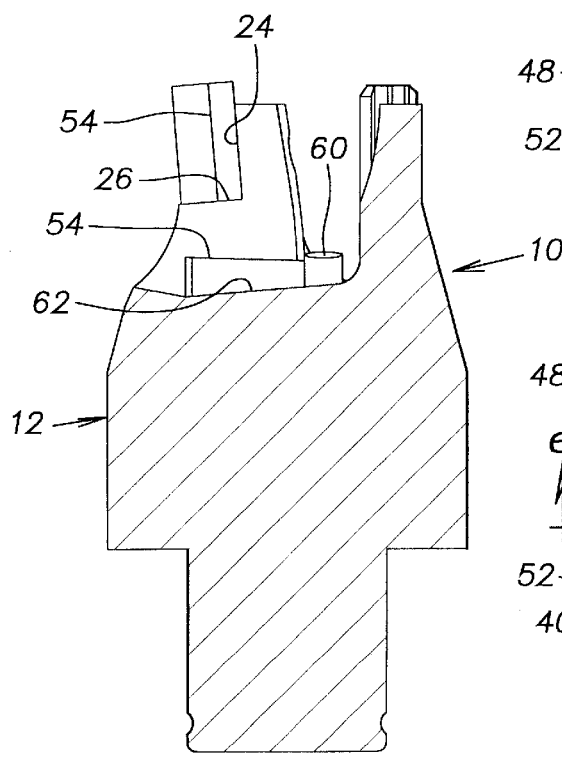
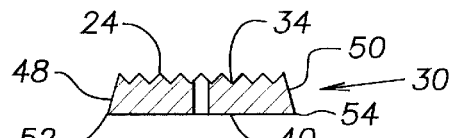
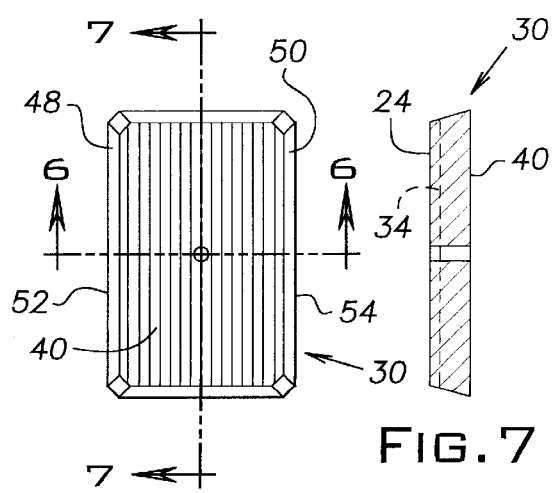

HOLLOW MILL TOOL

BACKGROUND OF THE INVENTION

This invention relates to a hollow mill tool and more particularly to a mill tool which is adapted to mill the outside diameter of a cylindrical work piece with repeat cuts of the inserts within a tolerance of 0.001 inch.

Cutting inserts for milling tools are mounted in a variety of ways. Typical arrangements for mounting an insert on the tool holder pockets include the use of V-bottom inserts, top clamps, and adjustable mounts. The use of V-bottom inserts quickly wear out the tool holder pockets. Top clamps are positioned between tool posts to clamp the inserts against it's tool post and, by being so positioned, tend to cause chip clearance problems. Adjustable cutter mounts are difficult to align precisely on the cutting diameter and they tend to stray from their adjusted positions during cutting operations.

BRIEF DESCRIPTION OF THE INVENTION

This invention provides a hollow milling tool having a cylindrical shank portion and a plurality of radially spaced and axially extending tool posts integrally formed with and projecting from the shank portion about a longitudinal axis of the tool. Each tool post is provided with a cutting insert mounting face and each mounting face defines a first plurality of axially extending serrations. A cutting insert is mounted on each mounting face and each cutting insert is provided with a second plurality of axially extending serrations which define a back face of the insert. The insert serrations mesh with the serrations of the mounting face. A threaded fastener extends through a front face of each cutting insert and is threadedly received in each of the tool posts to securely hold each cutting insert against it's tool post.

Each tool post has a mounting pocket for it's cutting insert and clear radial spacing is provided between the tool posts for effective chip removal during a cutting operation.

A cutting insert may be provided on the shank and within the cutting circle of the milling tool to permit cutting and/or chamfering of an end of the workpiece.

The tool posts may be spaced unequally about the cutting circle to minimize harmonic vibrations at higher cutting speeds.

BRIEF DESCRIPTION OF THE DRAWINGS

FIG. 3 is an end view of the mill cutter;

FIG. 3a is a fragmentary cross sectional view, the plane of the section being indicated by the line 3A—3A in FIG. 3;

FIG. 4 is a sectional view of the mill cutter, the plane of the view being indicated by the line 4—4 in FIG. 3;

FIG. 5 is a rear view of a cutter insert according to this invention;

FIG. 6 is a sectional view of the insert, the plane of the view being indicated by the line 6—6 in FIG. 5; and FIG. 7 is a sectional view of the insert, the plane of the view being indicated by the line 7—7 in FIG. 5.

DETAILED DESCRIPTION OF THE INVENTION

Figure 1:
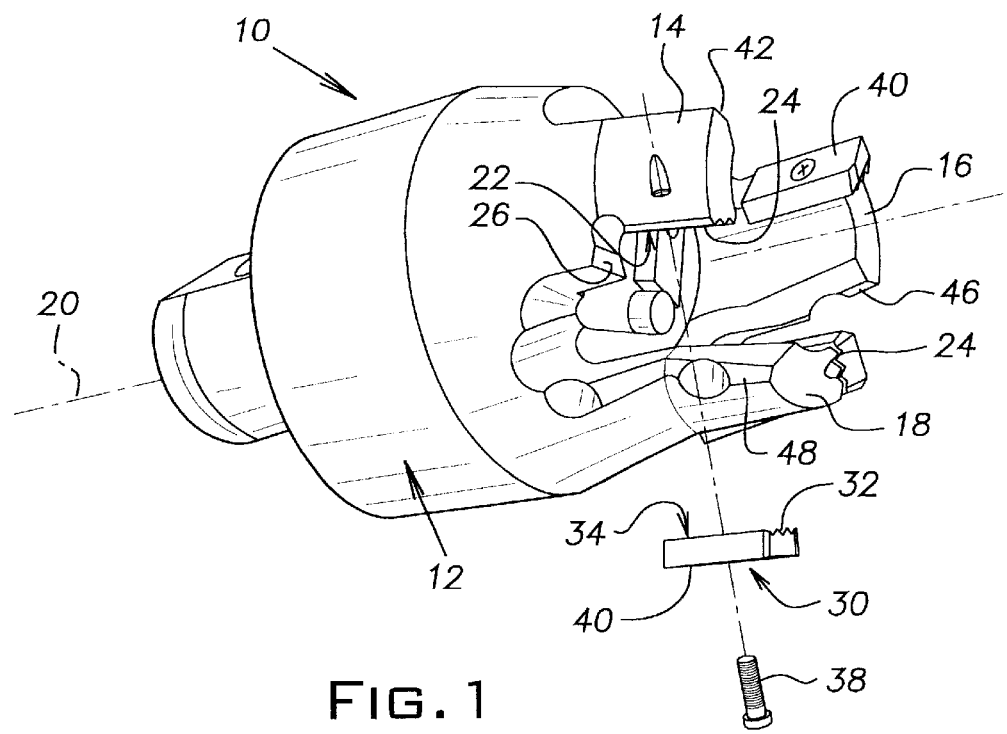
FIG. 1 is a perspective view of a mill cutter according to this invention showing a cutting insert and it's mounting fastener in an exploded position.
Figure 2:
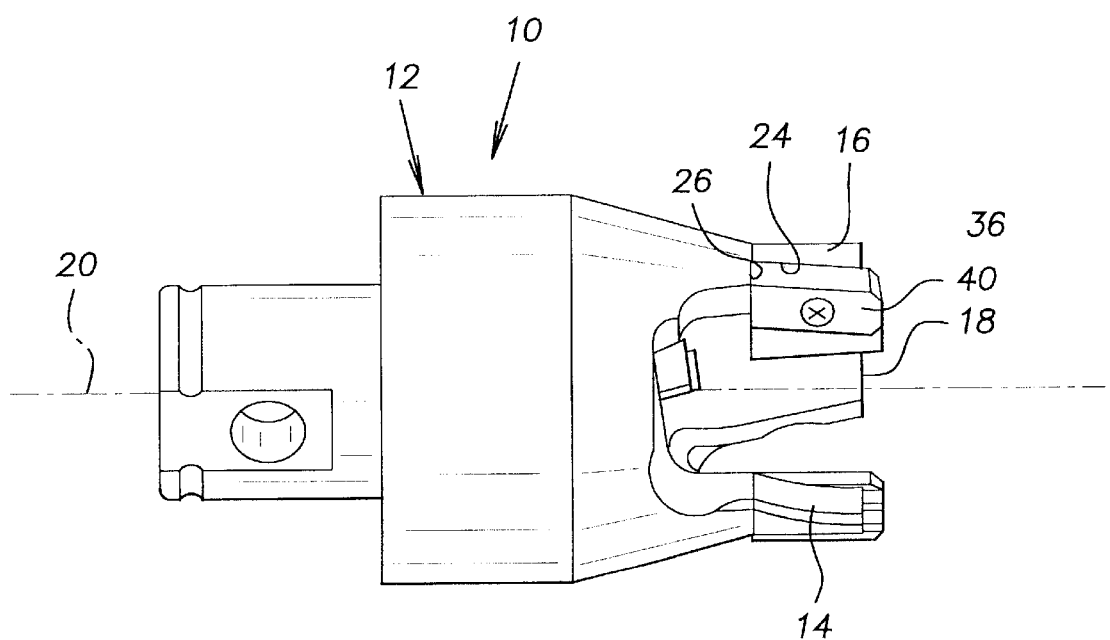
FIG. 2 is an elevational view of the mill cutter.

Referring now to the drawings, there is illustrated a hollow mill tool 10 according to this invention. The tool 10 has a shank portion 12 and a plurality of radially spaced and axially extending tool posts 14, 16, and 18 integrally formed with a projecting from the shank portion 12 about a longitudinal axis 20 of the tool 10. The tool posts 14–18 are spaced unequally about the circumference of the tool 10 to minimize harmonic vibrations during cutting operations. Each of the tool posts 14–18 defines a cutting insert mounting pocket 22 comprising a longitudinal cutting insert mounting face 24 and an angularly related base 26. Each mounting face 24 has a plurality of axially extending serrations 28.

A cutting insert 30 is mounted in each pocket 22. Each cutting insert 30 has a plurality of axially extending serrations 32 defining a back face 34 thereof. The serrations 32 intermesh with the serrations 28 of the mounting pocket 22 and an end face 36 of each insert 30 rests on the base 26 of each pocket. A threaded fastener 38 extends through an opening 39 in a front face 40 of each insert 30 and is receive in each of the tool posts 14, 16, and 18 to securely hold each cutting insert against it's tool post.

The mill tool 10 is adapted to be driven about it's longitudinal axis 20 in a counterclockwise direction, as viewed in FIG. 3, with each cutting insert 30 leading its tool post 14, 16, or 18. Each tool post 14,16, and 18 has a trailing end 42, 44, and 46, respectively, and it may be noted that clear radial spaces are defined between each front face 40 and each trailing end 42,44, and 46 for maximum chip removal during cutting operation.

As may be noted in FIGS. 5–7, each cutting insert 30 has a trapezoidal transverse cross section (FIG. 6) and a trapezoidal longitudinal cross section (FIG. 7). It may also be noted that the back face 34 and the front face 40 of the insert 30 are parallel and that a first side face 48 and a second side face 50 form acute angles with the front face 40 and longitudinal intersections of those faces define cutting edges 52 and 54. In the illustrated embodiment each cutting edge 54 is the active cutting edge. When that cutting edge is chipped or is worn, the fastener 38 may be removed and the insert may be rotated 180° about the axis of the opening 39 to position the cutting edge 52 in a cutting or working position. Each cutting edge 54 defines a line lying in a plane tangent to a imaginary cutting cylinder 56. The cutting cylinder 56 (FIG. 3) has a diameter corresponding to an outside diameter of a workpiece machined by the mill tool 10 within a repeatable tolerance of ±0.001 inch. As may be seen in FIG. 3A, the cutting edge 54 is positioned at a slight angle $\alpha$ so that as the tool 10 advances on the workpiece an end point 58 of the edge 54 initially engages the workpiece and the edge 54 advances at the angle $\alpha$ along a sidewall of the workpiece.

The cutting operation continues until the end of the workpiece is engaged by a stop pin 60 mounted on a base 62 of the shank portion 12. A cutter 30 is mounted of the base 62 so that its cutting edge 54 is adapted to cut or chamfer the workpiece.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A hollow mill tool comprising a shank portion and a plurality of radially spaced and axially extending tool posts integrally formed with and projecting from said shank portion about a longitudinal axis of said tool, each of said tool posts having a longitudinal cutting insert mounting face, each mounting face defining a first plurality of axially extending serrations, a cutting insert mounted on each mounting face, each cutting insert having a cutting edge which defines a cutting cylinder upon rotation about said longitudinal axis, each cutting insert having a second plurality of axially extending serrations defining a back face and intermeshing with said first plurality of serrations, a threaded fastener extending through a front face of each said cutting insert and being received in each cutting insert mounting face of said tool posts to securely hold each cutting insert against its tool post, wherein each cutting insert has a trapezoidal transverse cross section, the back face and the front face of each cutting insert are parallel, the back face and the front face of said cutting insert are connected by first and second side faces, said side faces forming acute angles with said front face at a longitudinal intersection defining a cutting edge, and each cutting edge defines a line lying in a plane tangent to a cutting cylinder and wherein said cutting cylinder has a diameter corresponding to an outside diameter of a workpiece machined to a tolerance of ±0.001 inch by said mill tool.

2. A hollow mill tool according to claim 1 wherein said tool posts are unequally spaced about said cylinder.

3. A hollow mill tool according to claim 1 wherein each cutting edge is angularly related to said longitudinal axis.

4. A hollow mill tool according to claim 3 including a workpiece stop pin mounted on a base of said shank portion.

5. A hollow mill tool according to claim 4 including a cutting insert mounted on said base.

* * * * *